Feb. 18, 1964 A. R. HILBINGER 3,121,788

HALL-EFFECT MULTIPLIER

Filed July 27, 1961

ALBERT R. HILBINGER
*INVENTOR.*

BY *Thomas J. Holden*
*Donald M. Sandler*
*ATTORNEYS*

3,121,788
HALL-EFFECT MULTIPLIER

Albert R. Hilbinger, Cockeysville, Md., assignor to Aircraft Armaments, Inc., Cockeysville, Md., a corporation of Maryland Filed July 27, 1961, Ser. No. 127,357
2 Claims. (Cl. 235—194)

This invention relates to multipliers for analogue computers, and more particularly to a multiplier of the class described which utilizes the Hall-effect.

The Hall-effect is evidenced by the appearance of a voltage across the width of a rectangular conductor when a control current flows along the length and a magnetic field exists at right angle to the width and the length. It provides a useful method of attaining the instantaneous product of two variable quantities represented by the current and the magnetic field respectively. If the magnetic field is derived from a field coil carrying a current, the Hall voltage, within limits, will be proportional to the product of the control current and the field current. It is seen, therefore, that a Hall generator, that is, a device utilizing the Hall-effect, is essentially a current operated device.

Practical Hall generators, are constructed using Hall-effect strips in the form of thin rectangular semiconductor wafers. In order for the Hall voltage to have an acceptable signal-to-noise ratio, it is essential that the control current and the flux density be as large as possible. The value of control current is limited by the joule heating due to flow of control current in the strip. On the other hand, the valve of flux density is limited by the departure of the flux density from a linear relationship to the ampere-turns of the field coil.

The field coil can be driven successfully from a high impedance source, such as an operational amplifier in a vacuum tube analogue computer, by providing the coil with a large number of turns. The small current available from the amplifier will produce the required number of ampere-turns. However, the small current available from a high impedance source does not provide a control current of sufficient magnitude to drive the semi-conductor strip and obtain a significant Hall voltage. It is necessary therefore to convert the voltage output of an operational amplifier in the control current circuit to a current by interposing a transistor amplifier, or the like, between the operational amplifier and the semi-conductor strip. Generally, the power supply requirements of the interposed amplifier are so different from those of the operational amplifiers of the computer, that a complexity is introduced into a computer set up that tends to discourage the use of Hall-effect multipliers. In addition, the frequency response of the interposed amplifier due to stability considerations is generally of lower order than that of the computer as a whole, so that this inherent limitation also tends to discourage the use of Hall-effect multipliers.

It is therefore a primary object of the invention to provide a Hall-effect multiplier which is compatible with high impedance sources without introducing the deleterious factors outlined above.

As a feature of this invention whereby the primary object is achieved, a Hall-effect current amplifier is introduced in the control current circuit of a Hall-effect generator. The output of one high impedance source, desired to be multiplied by the output of a second high impedance source, is applied to the field coil of the device. The second high impedance source is applied to the field coils of the amplifier. By applying a direct voltage across the Hall-effect element of the amplifier, the control current thereof can be adjusted to its maximum permissible value. The amplifier, thus biased, produces at its output an amplified current proportional to the output of the second source, which is applied to the Hall-effect element of the generator. From the above, it is seen that the power supply requirements of the multiplier are simple, and the power consumption is relatively low in comparison with a conventional transistorized amplifier. Furthermore, since the band width of Hall-effect amplifier can be made wider than most operational amplifiers having an equivalent stabilized current gain, the multiplier does not introduce limitations on the response of the computer.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be sufficient breadth to prevent the appropriation of this invention by those skilled in the art.

Figure 1:
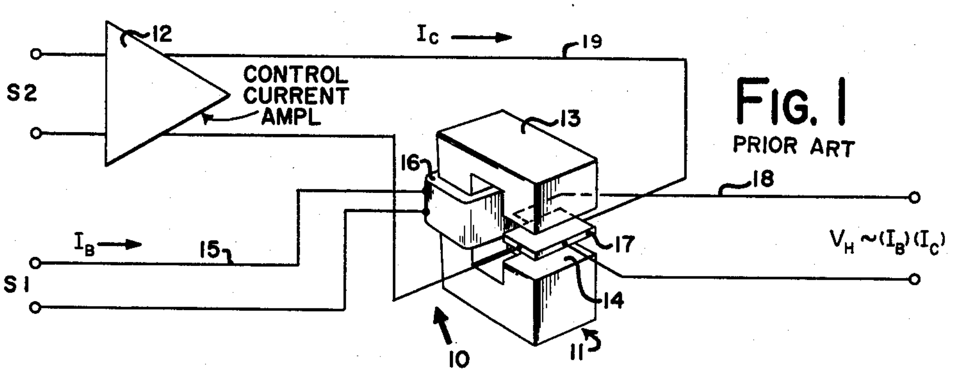
FIGURE 1 shows a Hall-effect multiplier that includes a conventional control current amplifier that drives a Hall-effect generator.

Referring now to FIGURE 1, $S_1$ and $S_2$ are considered to be high impedance signal sources such as the output of operational amplifiers from which a maximum of about 1 ma. can be drawn. The problem is to attain the instantaneous product of the voltages of these sources, and to this end, a conventional Hall-effect multiplier 10 may be utilized. Multiplier 10 includes Hall-effect generator 11 and control current amplifier 12. Generator 11 comprises a body 13 of magnetic material that may be C-shaped with a gap 14 within which a magnetic field is created when current flows from source $S_1$ through field leads 15 and field coil 16 wrapped around a leg of body 13. Suitably supported within gap 14 is a thin, rectangular, semi-conductor strip 17 which has a Hall coefficient sufficiently large to produce the desired results.

The Hall coefficient $R_H$ of the strip is defined as follows:

$$R_H=(\mu_H)(\rho)$$

where $\mu_H$ is the Hall mobility of the strip and $\rho$ is its resistivity.

The Hall voltage $V_H$ appearing at the set of output leads 18 is given by $$V_H=(R_H)(I_c)(B)/t$$

where $I_c$ is the control current flowing through the set of input leads 19, B is the flux density in gap 14, and T is the thickness of strip 17.

The flux density B is given approximately as follows:

$$B=1.26(N)(I_B)/L$$

where N is the number of turns in winding 16, $I_B$ is the current in leads 15, and L is the length of gap 14.

Combining the equations gives:

$$V_H = (k)(I_B)(I_c)$$

where $k$ is a constant depending upon the circuit parameters.

The limitations of multiplier 10 are due to amplifier 12, and arise because of the method of coupling and the high gain required. To obtain D.-C. response as well as A.-C. response, amplifier 12 must be direct-coupled to strip 17. Because of linearity and accuracy requirements, feed-back stabilization of the amplifier is usually required. To achieve the closed-loop gain required, the stability of amplifier 12 usually requires the overall frequency response of the amplifier to be reduced. As a result, the frequency response of multiplier 10 leaves much to be desired. In addition, the power supply requirements for amplifier 12 are generally incompatible with the power supply available to the high impedance sources.

A multiplier generally in accordance with the schematic showing in FIGURE 1 was actually constructed using a ferrite magnet core and an indium arsenide element. Such multiplier is adequately shown and described in an article, entitled "Hall-Effect Multipliers," appearing in the July 15, 1960, issue of Electronics. The parameters of this multiplier, including its overall band width, power consumption, compatability with input voltages from vacuum tube computers, size and weight, zero drift characteristics, and sets of power supplies, form the basis for comparison with the improved multiplier shown schematically in FIGURE 2.

Improved multiplier 20 is driven from high impedance signal sources $S_1$ and $S_2$, and includes Hall-generator 21 that acts as a current amplifier for Hall-generator 22 which is comparable with generator 11 of the conventional Hall multiplier shown in FIGURE 1. Coil 16 of generator 21 is driven from source $S_2$, while coil 16 of generator 22 is driven from source $S_1$. Strip 17 of generator 21 is biased by D.C. battery 23 such that the control current $I_c'$ through the strip is the maximum value permitted by heat dissipation characteristics. As a result of this arrangement, the voltage at the ouput of strip 17 of generator 21 is proportional to the product of $I_c$ and $I_c'$. If the strips of generators 21 and 22 are identical, strip 17 of generator 21 works into a matched load with the result that the control current $I_c''$ driving strip 17 of generator 22 is maximized. Thus, the input current $I_c$ to generator 21 is amplified to produce the output current $I_c''$. Depending upon the magnitude of the permissible bias current $I_c'$, the saturation characteristics of the core material of body 13, the design of the core, and the material of the strip, the current gain of generator 21 could easily exceed fifty with presently available materials.

As above described, the control current $I_c''$ is applied to strip 17 of generator 22, and the field current is applied to coil 16 of generator 22. The Hall voltage at the output of generator 22 is proportional to the instantaneous product of $I_B$ and $I_c''$. However, the current $I_c''$ is, itself, proportional to the current $I_c$, so that the voltage at leads 18 of generator 22 is proportional to the products of the voltages at sources $S_1$ and $S_2$.

Figures 2, 3:
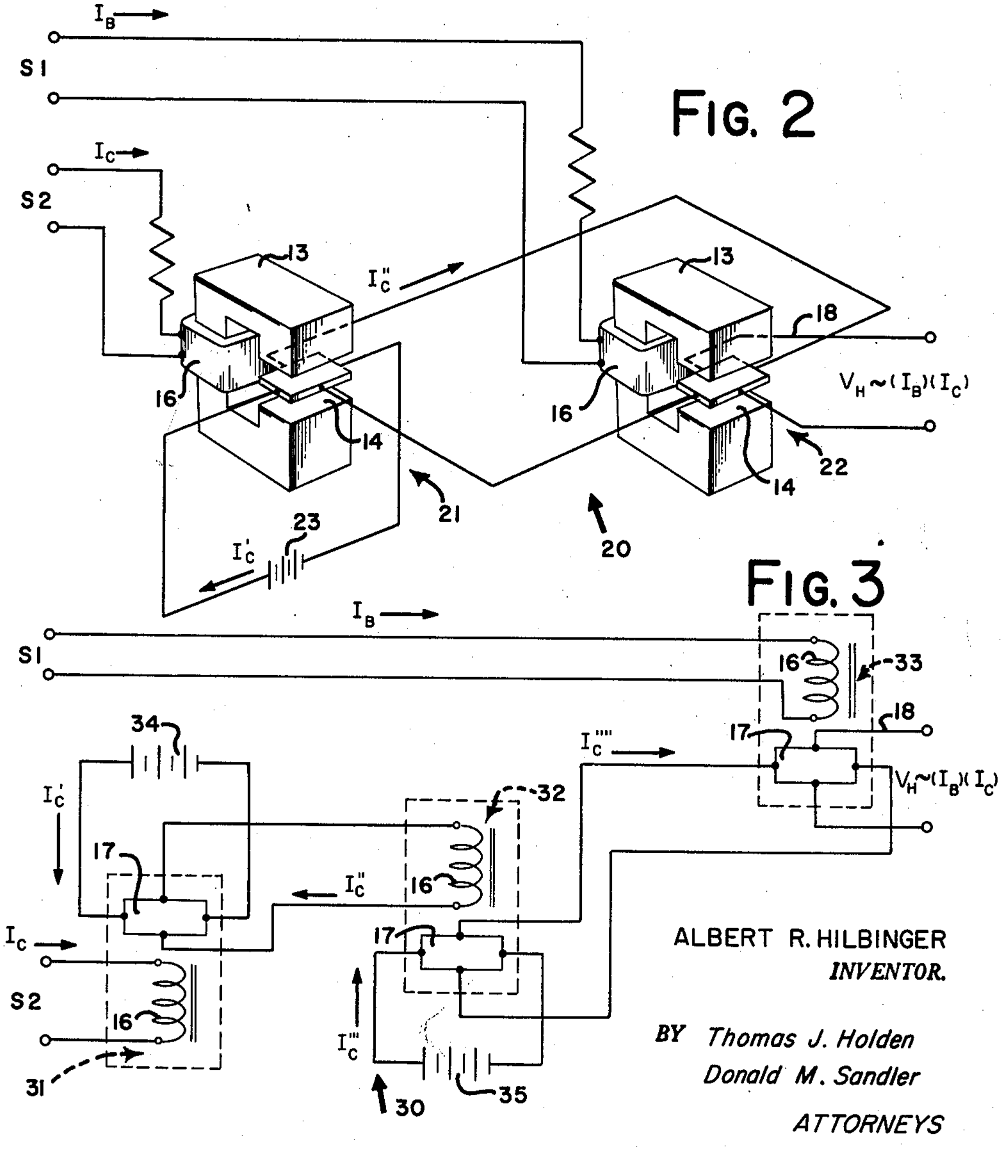
FIGURE 2 shows a Hall-effect multiplier in which a Hall-effect generator is used as a control current amplifier to drive another Hall-effect generator.
FIGURE 3 is a schematic of a modification of the multiplier of FIGURE 2 and shows two Hall-effect generators coupled together to form a control current amplifier that drives a third Hall-effect generator.

It is believed evident that the basic approach illustrated in FIGURE 2 considerably simplifies multiplier design in comparison with the use of a conventional current amplifier. The overall bandwidth of a multiplier made in accordance with this invention should be considerably increased, and its power consumption should be considerably lowered.

Sometimes the number of turns required for coil 16 is so large that space considerations preclude their incorporation into the available coil. When this occurs, the construction shown in FIGURE 3 can be utilized. Here, multiplier 30 comprises Hall-effect generators 31, 32, and 33, with the first two generators constituting a current amplifier for the last generator.

The current $I_c''''$, the output of second generator 32, can be no larger than that attainable with the single generator 21 of FIGURE 2 if all of the generators are identical and are operated at their peak. This fact can be seen by recalling that the Hall voltage is proportional to the product of the flux density with the control current. It is thus the value of the flux density produced by the field current rather than value of the field current itself which determines the magnitude of the maximum attainable Hall voltage.

However, by operating generators 31 and 32 at less than capacity, and providing the maximum value of control current $I_c''''$ in two steps, it is possible to achieve improved linearity characteristics at an expense of increased power consumption.

Those skilled in the art will recognize that the C-shaped magnets disclosed herein are only one of many different types of magnets which might be used to practice this invention. For this reason, the terminology Hall generator is intended to cover a device having an element with at least two sets of terminals, and means for producing a magnetic field in the element, such that when current is passed through one set of terminals, the Hall-effect is manifested at another set of terminals. The term Hall-effect multiplier is intended to cover a device having means for amplifying the current to a coil which produces the magnetic field in a Hall generator.

As used in this description, the term "set of input terminals" as applied to a Hall-effect strip means the terminals by which the control current is supplied to the strip; and the term "set out output terminals" means the terminals across which the Hall voltage appears when control current passes through the strip in the presence of a properly oriented magnetic field.

What is claimed is:

1. Apparatus for multiplying together two electrical signals comprising in combination:
   *a.* a first Hall generator assembly having a magnet with a coil and a Hall-effect strip;
   *b.* means connecting the first of said signals across the coil of said first generator;
   *c.* a second Hall generator assembly having a magnet with a coil and a Hall-effect strip;
   *d.* means connecting the second of said signals across the coil of said second generator;
   *e.* a source of bias voltage independent of the Hall output of said first and second generators and connected across the strip of said second generator for establishing a control current in said last mentioned strip that causes it to produce in response to the second of said signals a Hall voltage that is a function of the second of said signals; and
   *f.* means connecting said Hall voltage directly across the strip of said first generator for establishing a control current in said last mentioned strip that causes it to produce in response to the first of said signals a Hall voltage that is a function of the product of said two signals.

2. Apparatus in accordance with claim 1 wherein said bias voltage is substantially nonvarying with time during normal operation of the apparatus.

References Cited in the file of this patent

UNITED STATES PATENTS

| | | |
|---|---|---|
| 2,988,707 | Kuhrt et al. | June 13, 1961 |
| 3,003,698 | Kuhrt et al. | Oct. 10, 1961 |